No. 890,671. PATENTED JUNE 16, 1908.
B. J. MACAULAY & J. A. F. HALL.
PNEUMATIC WHEEL FOR VEHICLES.
APPLICATION FILED AUG. 12, 1907.

UNITED STATES PATENT OFFICE.

BRYCE JOHNSTON MACAULAY, OF EASTBOURNE, AND JAMES ALFRED FREDERICK HALL, OF HAMPDEN PARK, NEAR EASTBOURNE, ENGLAND.

PNEUMATIC WHEEL FOR VEHICLES.

No. 890,671.     Specification of Letters Patent.     Patented June 16, 1908.

Application filed August 12, 1907. Serial No. 388,220.

*To all whom it may concern:*

Be it known that we, BRYCE JOHNSTON MACAULAY and JAMES ALFRED FREDERICK HALL, subjects of the King of the United Kingdom of Great Britain and Ireland, residing, respectively, at 52 Seaside, Eastbourne, and Hampden Cottage, Hampden Park, near Eastbourne, both in the county of Sussex, in that part of the United Kingdom called England, have invented new and useful Improvements in Pneumatic Wheels for Vehicles for Preventing Puncture and Prolonging Life of Tires, of which the following is a specification.

This invention relates to improvements in pneumatic wheels for vehicles.

More particularly the invention has reference to that type of wheel wherein the air tube is placed between a supplementary trough shaped tire and the ordinary rim or felly of the wheel and wherein also the rim or wheel is partly within the trough shaped part, the object being to prevent puncture and to provide great resiliency.

Our invention is applicable to wheels already in existence or to those especially made for it.

Figure 1:
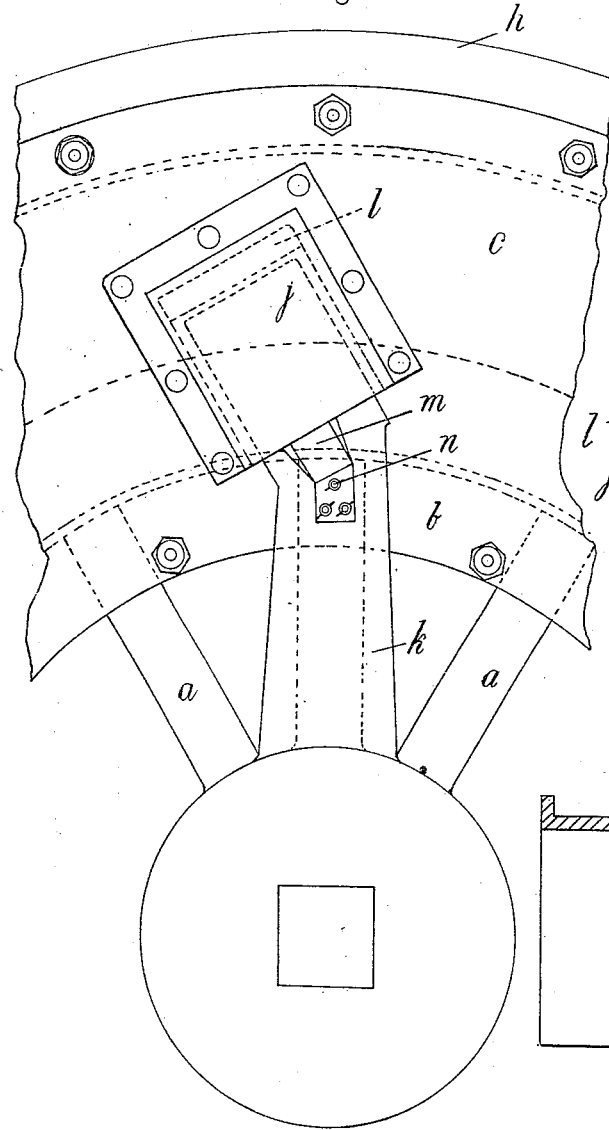
Figure 2:
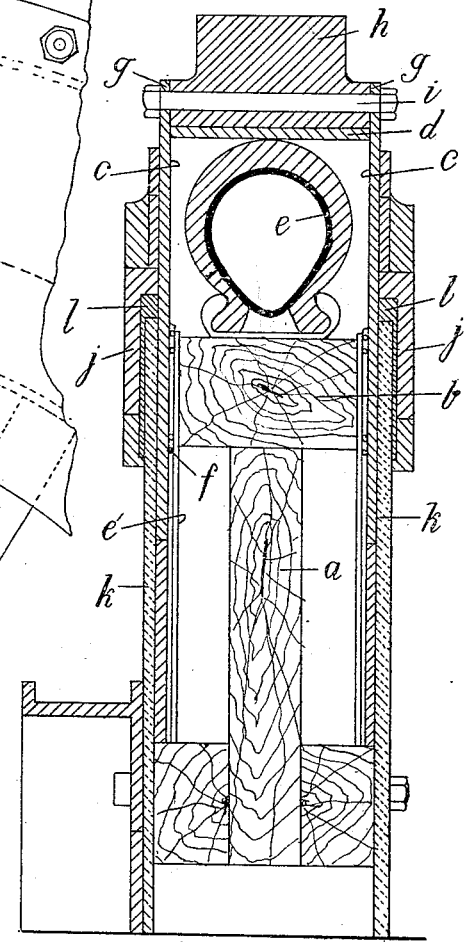

In carrying our invention into effect we proceed in or in about the following manner making reference to the accompanying drawing wherein Figure 1 is a side view of a portion of a wheel embodying our invention and Fig. 2 a cross section of Fig. 1.

In this specification we shall assume our invention to be applied to artillery wheel, but without confining it to that one class of wheel.

Referring to the drawing $a$ are the spokes of the wheel and $b$ the felly over which is placed the flanges $c$ of the trough shaped supplementary tire $d$, the air tube $e$ being placed between the outside of the felly $b$ and the inside of the tire $d$. The width between the flanges $c$ is greater than the width of the felly $b$ by so much as will accommodate a metal race $e'$ attached to the sides of the felly $b$, between which race and a similar one on the inside of the flange $c$ are the antifriction balls $f$. The flanges $c$ are continued beyond the bottom of the tire $d$ so as to form outer flanges $g$ between which are held the outer rubber tire $h$ by transverse bolts $i$.

Formed with or attached to the flanges $c$ are a number of slantingly placed pockets or recesses $j$ which receive the easy fitting corresponding outer ends of arms $k$ which by attachment to some of the spokes $a$ or otherwise are arranged to revolve with the wheel. At the bottom of each pocket $j$ is a rubber or other resilient cushion $l$ to prevent the outer ends of $k$ striking the said bottoms.

To enable the wheel and tire to be made rigid in the case of puncture or bursting of the air-tube, we provide a block $m$ on each side of the arms $k$, and in these blocks are slotted holes to receive thumb or other screws $n$ which enter the arms $k$, and by bringing the peripheries of these blocks in contact with the inner edges of the flanges $c$ and tightening these up, the tire $d$ can be held rigidly to the wheel.

Instead of having the blocks $m$ permanently attached to the wheel, we may provide them as detachable and attachable accessories to be used when needed.

What we claim as our invention and desire to secure by Letters Patent is:—

The combination with that class of pneumatic wheel wherein a supplementary trough shaped tire has its flanges outside the sides of the rim of the felly and wherein the air-tube is situated between the rim or felly and the bottom of the said trough shaped tire, of an outer thickened tread, slanting pockets or recesses on or in the outside of the flanges of the supplementary tire, arms attached so as to revolve with the wheel and having correspondingly slanted outer ends which enter easily the said pockets or recesses, resilient cushions at the bottom of the pockets or recesses, and emergency blocks by which the wheel and tire can be held rigidly to the wheel, substantially as hereinbefore described.

In testimony whereof we have signed this specification in the presence of two witnesses.

BRYCE JOHNSTON MACAULAY.
JAMES ALFRED FREDERICK HALL.

Witnesses:
H. D. JAMESON,
F. L. RAND.